United States Patent
Wang et al.

(10) Patent No.: US 8,271,622 B2
(45) Date of Patent: Sep. 18, 2012

(54) METHOD AND APPARATUS FOR A SYSTEM MANAGEMENT TOOL TO ADAPT COMMAND INTERFACE AND BEHAVIOR BASED ON INSTALLED FEATURES

(75) Inventors: Qinhua Wang, Austin, TX (US); Lavena Chan, Austin, TX (US); John Y. Chang, Austin, TX (US); Ajay A. Apte, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1119 days.

(21) Appl. No.: 12/056,167

(22) Filed: Mar. 26, 2008

(65) Prior Publication Data
US 2008/0301638 A1   Dec. 4, 2008

Related U.S. Application Data

(63) Continuation of application No. 11/002,699, filed on Dec. 2, 2004, now abandoned.

(51) Int. Cl.
*G06F 15/177* (2006.01)

(52) U.S. Cl. .................................. 709/220; 717/120

(58) Field of Classification Search .................. 709/220; 717/120, 100
See application file for complete search history.

(56) References Cited

U.S. PATENT DOCUMENTS

| | | | |
|---|---|---|---|
| 6,385,652 B1 * | 5/2002 | Brown et al. | 709/227 |
| 6,667,747 B1 * | 12/2003 | Spellman et al. | 715/714 |
| 2003/0004744 A1 * | 1/2003 | Greene et al. | 705/1 |
| 2004/0060036 A1 * | 3/2004 | Natori et al. | 717/100 |
| 2004/0117759 A1 * | 6/2004 | Rippert et al. | 717/100 |
| 2005/0289536 A1 | 12/2005 | Nayak et al. | |

* cited by examiner

*Primary Examiner* — Ryan Jakovac
(74) *Attorney, Agent, or Firm* — DeLizio Gilliam, PLLC

(57) ABSTRACT

A system management tool framework for a system management tool for extending system management commands related to software installation units such as software component, feature or product. The tool is constructed in accordance with an interface and framework that allows polymorphism and dynamic binding at run-time. When the system management software tool is constructed in accordance to the framework of the present invention, the software tool can be made scalable, flexible and adaptable to a heterogeneous distributed system.

18 Claims, 3 Drawing Sheets

METHOD AND APPARATUS FOR A SYSTEM MANAGEMENT TOOL TO ADAPT COMMAND INTERFACE AND BEHAVIOR BASED ON INSTALLED FEATURES

CROSS REFERENCE TO RELATED APPLICATIONS

The present application is a continuation of U.S. application Ser. No. 11/002,699 filed Dec. 2, 2004. Said U.S. application Ser. No. 11/002,699 is hereby incorporated by reference in its entirety.

BACKGROUND OF THE INVENTION

1. Field of Invention

The present invention relates generally to the fields of computer software in a client-server heterogeneous distributed network.

2. Description of Related Art

A software product typically has various optional installable features. The software sometimes has system management commands or task commands that influence its runtime behavior or configuration properties. For instance, a task command "createApplicationServer" creates a new application server in the system. Another example is that a task command "startServer" starts a server in the system. More than often the behavior of a system management command or task command provided a software product might need to be tuned based on which features users decide to install. For example, assuming a messaging software component is an optional installation feature of an application server product, when users create an application server they can configure a message engine on the created server only if the messaging component is already installed. Another example is that one software product needs to extend a system management command of another related software product. Using the same example as in the previous scenario, when users create an application server, users can configure a portal container on the created server only if the portal product is already installed somewhere on the system. This scenario is similar to the previous one except it crosses the product boundary and either resides on the local host or goes somewhere else in the network.

A common solution to address the first scenario is that during installation of the software, the software's command implementation queries all the installed features present, and disables some of the interfaces and/or logic on the software to be installed that are not available on the system or network. This solution however is not flexible and extensible. The command implementation needs to know all installation features and their relevance to the command. Whenever a new installable feature is introduced, the implementation of all the relevant commands need to be modified to accommodate the new installable feature.

Furthermore, concerning the second example above involving a network, when the enhancement of a command crosses the product boundary, due to the existence of a network, the above solution is no longer valid as it is very difficult for one software product to know whether all the other software products and their installation features are on the same system or network. Typically, therefore, the software product has to be programmed to provide a separate command for such heterogeneous distributed network instances. This approach is not user friendly, as users need to learn additional command syntax for these distributed products. In addition, this approach is not flexible as the implementation of this new command has a direct dependency on a command of another software product.

Factoring all of the above, it can be seen that what is needed is a superior method and apparatus for a system management tool, that is adapted to provide a command interface and behavior which is based on the existence of installed features and products, in particular in a heterogeneous distributed system, without the necessity of programmers developing and registering new commands every time a new software product is distributed in a network.

SUMMARY OF THE INVENTION

Accordingly, an aspect of the present invention is to provide an improved, scalable and flexible method and apparatus for a system management tool that is dynamically adaptable at runtime, via late binding, abstract classes and inheritance, in a new IDL (Interface Definition Language) framework, so that system management commands may automatically adapt their user interfaces and behavior based on the features and products already installed on a system, which may include access to a distributed system.

The framework of the present system management tool allows any optional installable features and software products to register, implement and package new extensions of an existing system management command in a product. The extensions are packaged as part of installable features and software products and these extensions are only activated whenever the features and software products are installed.

Therefore, the mechanism of the present invention is not only extensible but also is flexible.

While in the preferred embodiment the software of the present invention is directed to a system management tool, other types of software can also be accommodated by the present invention without departing from the teachings of the present invention. For instance, any piece of software to be installed on a network can be made to fit inside a wrapper that can be deemed a system management tool, to aid in the installation of the software, and be accommodated by the teachings of the present invention.

The present invention employs system management software with a new Interface Definition Language (IDL) interface framework on both server and client computer, for registering and instantiating new and existing system management commands, employing encapsulation, inheritance, polymorphism, and dynamic (late) binding at runtime, as part of a new application programming interface (API) framework, to increase portability and scalability when distributing and executing new system management commands in a heterogeneous distributed network.

In a preferred embodiment, the method and apparatus of the present invention employs a mainframe or personal computer to run the software tool, but in general any compatible piece of hardware or virtual machine can run the present invention.

Thus the preferred method and apparatus of the present invention is a computing platform running a software tool, which can accept human input, and may be written in any computer language (such as C, C++, Perl, Java or the like), preferably an Object Oriented programming (OOP) language, run by a computer system having an operating system. The computer system typically has one or more processors, primary and secondary memory cooperating with the processor(s), which executes instructions stored in the memory, I/O means such as monitor, mouse and keyboard, and any necessary specialized hardware or firmware. Depending on the language used to construct and implement the software tool, the source code, object code and/or executables of the tool may have any number of classes, functions, objects, variables, templates, lines of code, portions of code and constructs (collectively and generally, "a process step", "step", "block", "functional module" or "software module") to carry out the invention in successive stages as described and taught herein, and may be either a standalone software application, or employed inside of or called by another software application, or as firmware. The software process or software module may be constructed so that one portion of code in the application performs a plurality of functions, as for instance in Object Oriented programming (e.g., an overloaded process). The converse is also true, in that a plurality of portions of code could perform a plurality of functions, and still be functionally the same as a single portion of code. At any stage of the process step of the present invention, intermediate values, variables and data may be stored for later use by the program. In addition, the binary executable or source code data comprising the software of the present invention may reside on computer readable storage medium (e.g., a magnetic disk, which may be portable, such as a hard drive), floppy drive; memory (e.g., flash RAM); or a DVD or CD-ROM disk).

The sum total of all of the above advantageous, as well as the numerous other advantages disclosed and inherent from the invention described herein creates an improvement over prior techniques.

The above described and many other features and attendant advantages of the present invention will become apparent from a consideration of the following detailed description when considered in conjunction with the accompanying drawings.

BRIEF DESCRIPTION OF THE DRAWINGS

Detailed description of preferred embodiments of the invention will be made with reference to the accompanying drawings. Disclosed herein is a detailed description of the best presently known mode of carrying out the invention. This description is not to be taken in a limiting sense, but is made merely for the purpose of illustrating the general principles of the invention. The section titles and overall organization of the present detailed description are for the purpose of convenience only and are not intended to limit the present invention.

It should be understood that one skilled in the art may, using the teachings of the present invention, vary the program flow of the flowcharts without departing from the spirit of the invention herein.

DETAILED DESCRIPTION OF THE INVENTION

The present invention may be utilized to more readily register, instantiate, and configure system management type commands used in installing software in a heterogeneous distributed system, such as one having client and server. Such system management commands are commands for software that influence the software runtime behavior or configuration properties. For instance, a task command "createApplicationServer" creates a new application server in the system. Another example is that a task command "startServer" starts a server in the system. In a preferred embodiment the present invention is built using Java, an object-oriented programming language, and the distributed system architecture is a client-server model, but in general any programming language may be employed and the network may be a peer-to-peer network, N-tier client I server network, non-client-server model or other topology.

Figure 1:
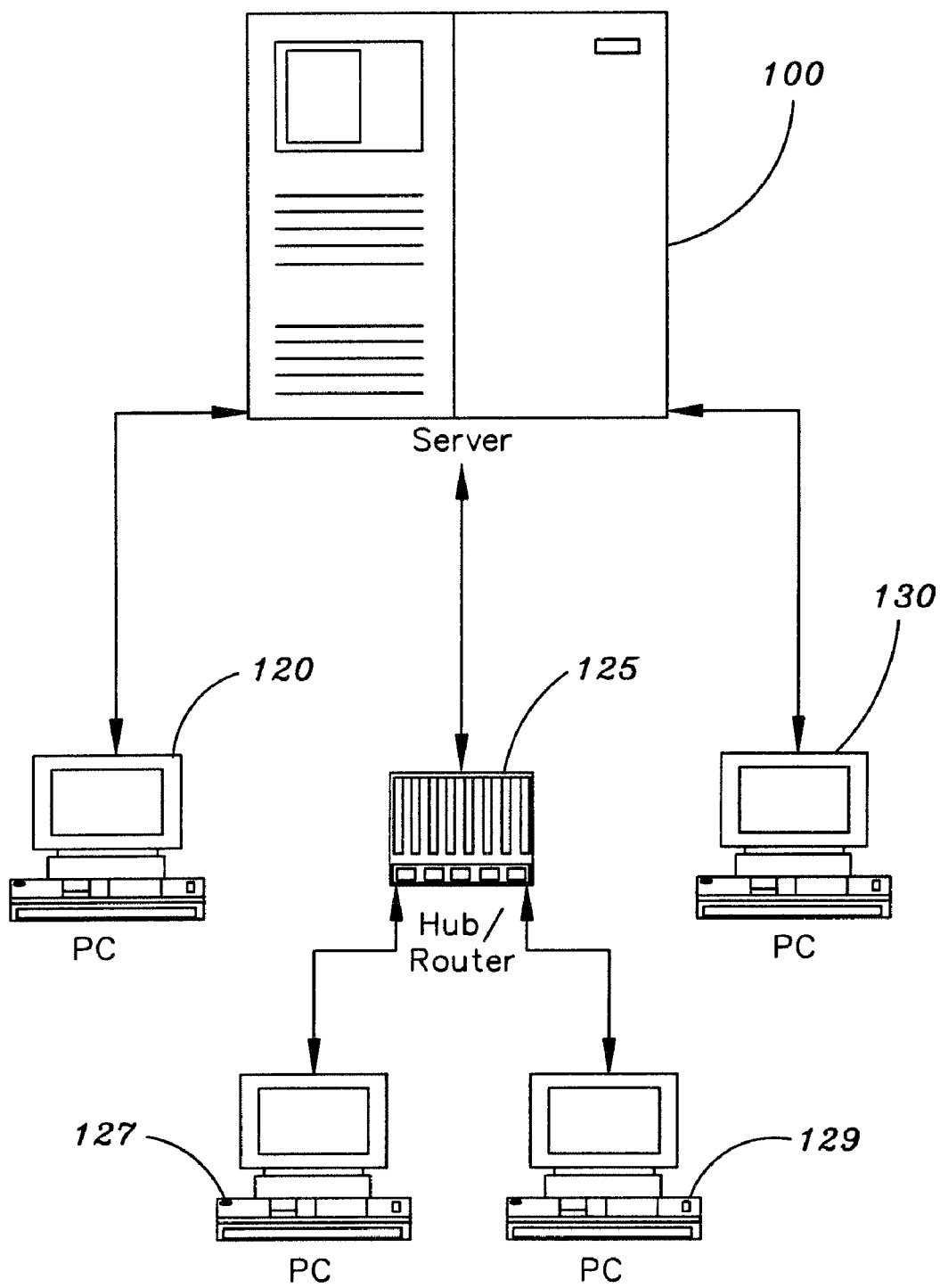
FIG. 1 is a schematic showing a heterogeneous distributed network in a client-server relationship, within which the present invention resides.

Turning now to FIG. 1, there is shown heterogeneous distributed network in a client-server relationship, with the adaptive system management tool of the present invention residing in both the client and server, and communicating via a suitable software interface protocol. A server, such as application-server 100, houses the server software portion of the software tool of the present invention, which is stored in the memory of the server. The server 100 communicates with several clients, 120, 127, 129, 130 in a distributed network, typically a plurality of personal computers, some of which may be connected together with a hub or router 125. In general the clients may be any computer system, personal computer, wireless devices, other server, and the like, forming with the server 100 a heterogeneous distributed system network. The system management software that resides in both the server and clients is built according to the framework taught by the present invention.

An important aspect of the present invention is that it provides a framework of a unified architecture that delays the binding between the command interface and implementation from developing time to run time. The described framework is provided by encapsulating the system management commands a piece of system management software may have via a language neutral command interface. This interface may also be termed, at the architecture level, a "protocol", at the source code level "I DL" (Interface Definition Language), or, at the software component level, an "API" (Application Programming Interface) or "ABI" (Application Binary Interface). In a preferred embodiment, the command interface is defined in XML format due to its programming language neutral nature and its flexibility for dynamic binding (late binding), which allows user-defined commands ("extensions" or "command extensions", to existing system management commands) to be seamlessly integrated into a distributed network, as described further herein. The key idea of this dynamic lazy binding mechanism is generating the client side stubs (software routines that provide a common function) for commands dynamically, at run time, by communicating with a corresponding stub portion found on the server interface, by nature of the stubs being part of the same common framework. This eliminates the need for clients to have command specific static stubs and prevents the potential complexities introduced by the mismatch between client and server such as operating system, product version, or product features differences.

In a preferred embodiment the object oriented language Java is employed to construct the software tool of the present invention, but in general any language may be used.

Figure 2:
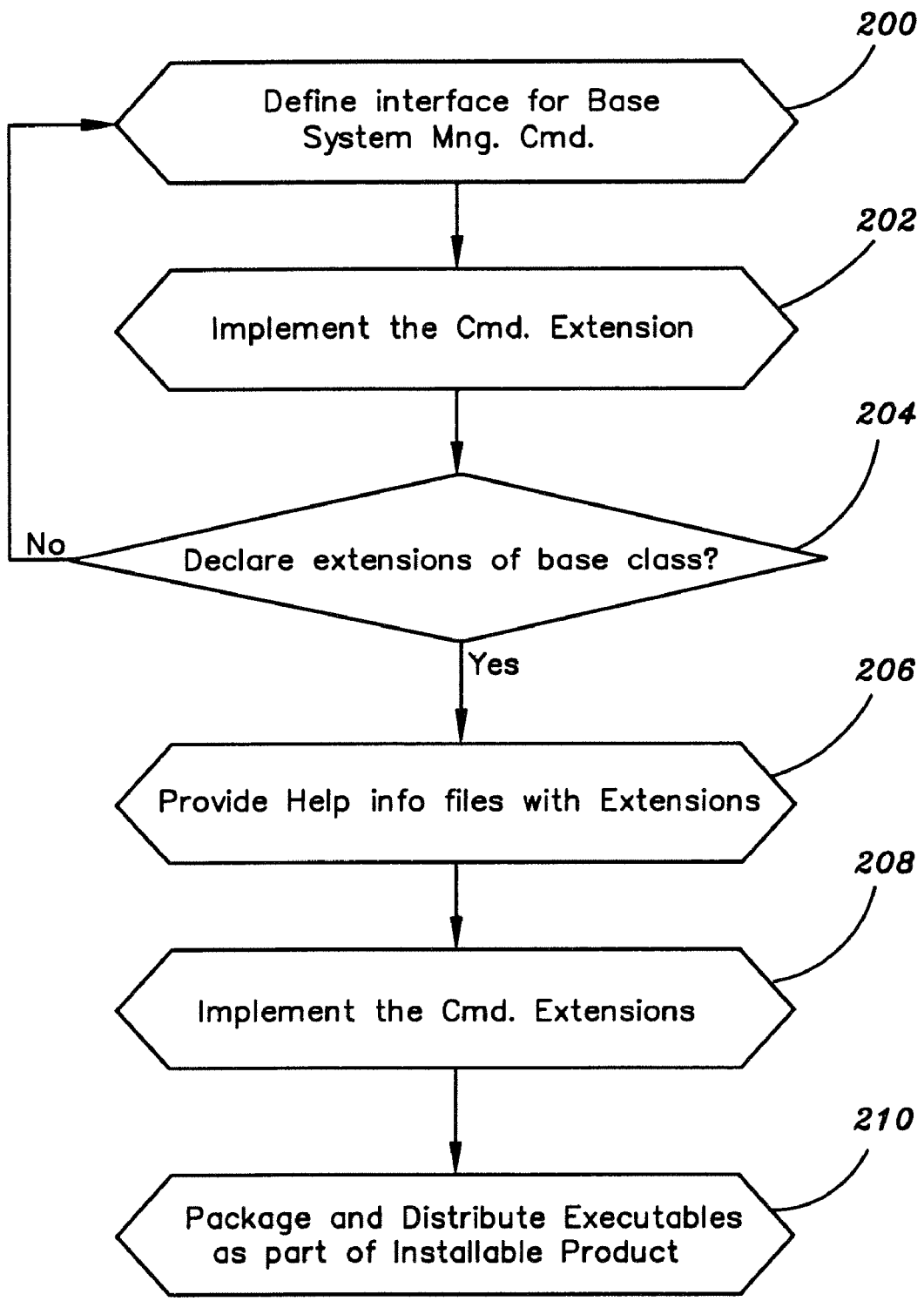
FIG. 2 is a flowchart showing the steps necessary to build the framework architecture for the present invention.

Turning attention now to FIG. 2, there is shown a flowchart showing the steps necessary to build the framework architecture for the system management tool of the present invention. As explained above, the goal is to provide a framework to implement a system management tool that will dynamically adapt a piece of software that is being installed on a computer within a distributed network without the programmer or the program having any prior knowledge of what components need to be turned on or present for the system management tool, except at run-time (i.e., dynamic binding). The basic idea is to package an interface definition, description and implementation, so a system management tool that conforms to this framework may allow a piece of software being installed in a system to dynamically discover (e.g., via late binding at runtime) all the available necessary components that need to be created and/or installed with the software in a distributed heterogeneous system, and/or to discover which features of the software being installed need not be installed (i.e., turned off). Generally this command is termed a "system management command" of the system management tool, which is also the generic term for all such commands. Whenever a new installable feature is introduced into software that is expanded or customized, and this new feature requires additional functionality or command options not found in an existing system management command, this new feature is termed a "extension" or "command extension" of a prior system management command. Extensions often need additional information to be provided to users, via help files, as explained further below.

For an example of the advantages of employing a common interface to allow dynamic binding, suppose that a developer of a piece of software having extensions (software capable of being expanded or customized) writes code so that the software can, as explained above, either have certain features or components turned on when the software is installed in a network, and/or, have the software be configured a certain way only when another software product is installed on the network. This behavior is termed a "conditional system management tool command" or "conditional extension" of a command extension. Generally the software that is so controlled by a command extension can be deemed "conditionally activated" software.

Thus if the conditionally activated extendible software is written to be extended within the framework as taught by the present invention, the developers of all software that share this framework can write command extensions to the software that cooperate with and conform to the framework through a common extension mechanism. With this common extension mechanism, and suitably employing abstract classes and inheritance, as necessary (e.g., using the keyword 'interface' and 'extends' in Java and 'virtual' in C++). any number of conditional system management extensions can be bundled with installation features to either override some base system management command behavior or extend the base command interface for additional options based on the version and features installed on the system. For example, the system management command can be a base class, and the extension commands can be an inherited class (in C++) or the system management command can be a superclass and the extension commands can be a subclass that inherits from the superclass (in Object Oriented Programming parlance), generally termed inherited classes. When the component or feature that provides the command extension is installed, the behavior of the command will automatically take the new component and feature into consideration without any user's intervention and knowledge, as the command request is rerouted to the command extension intelligently. Hence any command request message from system management command object will be routed within the network to the proper command extension to handle that object request.

Another scenario for conditionally activated software is that an optional component and feature may allow users to provide additional options specific to the component or feature. The present invention allows one to capture the component and features and their additional command options into command extensions, and bundles their command extensions as part of its distribution package. Therefore, these additional command options that are specific to the component or feature are only visible to the end user when the component or feature is installed on the system.

Since this extension mechanism is completely dynamic and flexible the same idea can be applied to across the product boundary. The only thing one needs to do is to replace the component or feature with another product. An example of this scenario is that a database product is installed on a system with the presence of a middleware application server product on the same system. The database product may extend some system management commands of the application server product so that the same command provided by the application server product can be used to configure the data access to the backend database. Assume if all the products on the same system use this extension mechanism, end users can configure their system end to end through a single familiar command interface. This would improve user experience and lower user's learning curve significantly.

The polymorphism of the present invention allows, at runtime, the interpreter and/or compiler, working with the operating system as necessary, to automatically invoke the proper method associated with each system management tool command and any instantiated object associated with the command, even though the same command name is used for many different versions of system management tools commands. In this way, an end user invoking a system management tool command is oblivious to the fact that there may be several different versions of the same command. In is understood that in the present invention, which is implemented by Java, when the term "compiler" or "interpreter" is used, that the term is used generically to refer to not only a Java native language machine compiler, but also a JIT (Just In Time) compiler, Java Virtual Machine interpreter, or any other Java component to convert instructions into machine code, including a hardware Java Chip, working with any necessary operating system and/or firmware of a computer.

Thus polymorphism in object oriented programming allows a generalized request or function to produce different results based on the object that is attached to it at any given time. Furthermore, via inheritance, each extensible command (a command that is based upon a previously designed base command) can inherit the properties of a base command it inherits from. The encapsulation afforded by polymorphism (late-binding), if a common interface is employed for all the system management software, as taught by the present invention, insures that the proper method for a particular command is called by a system management software program without the individual program having to separately query the entire network it resides in on its own, assuming the other programs are also written in this common framework. Finally, from the development side, a common framework eliminates the necessity for the programmer to write separate functions for each particular version of system management tool and then having to identify which features must be turned off when the tool is installed, or which other software tools and products must be also installed on the network when the tool is installed. The software implemented by the framework of the present invention, and the compiler/interpreter running this software by nature of polymorphic OOP, automatically takes care of proper binding at run-time (dynamic or late binding).

Thus, turning attention to FIG. 2, there is shown an apparatus flowchart for a component, feature or product constructing command extensions through the framework provided by the present invention. As a first step, step 200 labeled "Define Interface for Base System Mng. Cmd." the developer of the system management tool of the present invention would define the interface of the system management tool, and in particular the interface of all the system management and task command steps and their implementation, and any dependent or inherited classes. Depending on the language used and the state and layer of the data/source code, this interface could take the form of a protocol, IDL, API, abstract class or superclass (a superclass in object technology is a high-level class that passes attributes and methods, down a hierarchy, to subclasses, the classes below it), abstract or concrete superclasses; classes with inheritance and/or any combination of the above. In a preferred embodiment the framework is for the Java language.

As a second step, step 202 in FIG. 2 labeled "Implement the Cmd. Extension", the developer of the system management tool of the present invention would implement the base system management command or task command through a base class. This might be done in connection with a polymorphic class such as a virtual class, abstract class, or superclass, depending on the language. These base classes are associated with the interface to the protocol of step 200. Thus all system management commands, extensions of a system management command and all conditional extensions of system management commands have an inherited class (i.e. derived class) that may inherit from a base class associated with it.

From the teachings of the present invention, a component, feature or product can be allowed to provide a command extension or conditional extension to override the behavior of a base class command extension. Likewise, the base command interface can be extended by an inherited class interface. By virtue of Object Oriented Programming, the system management tool of the present invention can have command interfaces and behavior determined at run time through dynamic binding between the interface and the implementation, when the implementation(s) are instantiated.

In the third step, decision box 204 in FIG. 2, labeled "Declare extensions of base class?" the goal is to declare command extensions of the base system management commands have been accounted for; if so, one proceeds to step 206, as indicated by the "Yes" branch of decision box 204; if not, as indicated by the "No" branch of decision box 204, the flow continues to box 200 and the process repeats until all base classes and all extensions have been properly constructed according to the rules of the framework, so that they work within a framework allowing polymorphism as taught herein.

In step 206, labeled "Provide Help Info files with Extensions", the component, feature or product that provides command extensions through the framework for the tool of the present invention would provide national language supported (NLS) help files, in the form of translatable help messages, for each additional command extension, if any additional command options are defined by the extension. Help files are useful for both the developers and users of the tool, so they may learn more about the system management command, extensions and conditional extensions via detailed descriptions of the commands.

In step 208, labeled "Implement the Cmd. Extensions", the developers of the component, feature or product that provide the command extension through the framework of the tool develop the logic of the command extension following on the rules laid out by the framework.

In step 210, labeled "Package and Distribute Executables as part of Installable Product", the tool of the present invention is distributed to all nodes as part of the relevant component, feature or product within the heterogeneous distributed network as a binary executable.

Figure 3:
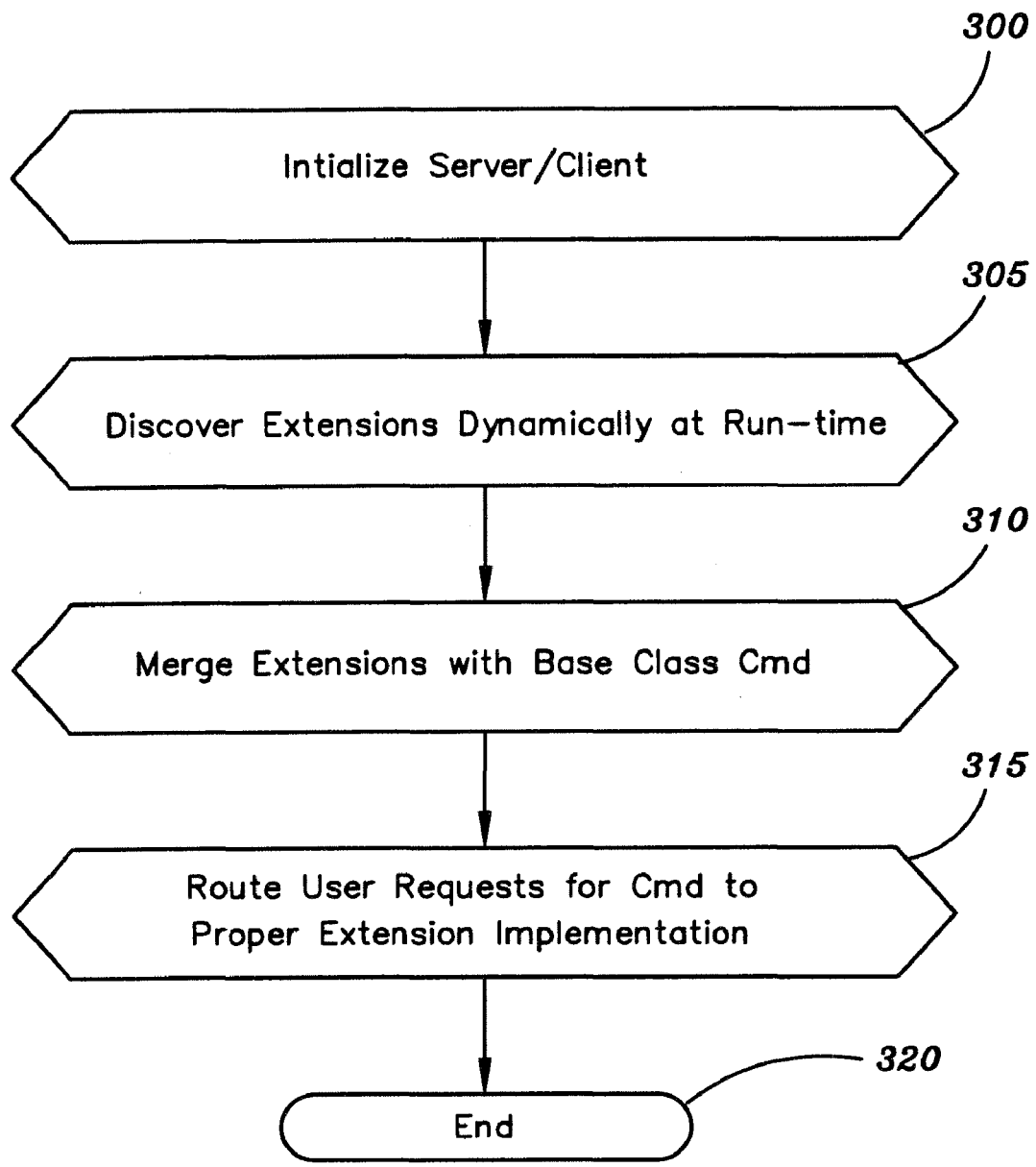
FIG. 3 is a flowchart of the program flow for the present invention as constructed within the framework described in FIG. 2.

Turning attention now to FIG. 3, there is shown the program flow for the method and product of the present invention, once all software products have been constructed in accordance with the framework of FIG. 2.

Step 300 of FIG. 3 is to initialize the server and client nodes (in the preferred client/server architecture as described herein). As a practical matter this would be done by each computer when it boots up and becomes aware of the network to which it is connected.

Step 305 in FIG. 3 occurs when the system management tool is launched, and discovers all the system management command, command extensions and conditional extensions dynamically, that is, through run-time (late) dynamic binding, a feature of polymorphism. Thus these extensions are merged with the base command from which they are derived from, and made an integral part of the base command, as shown in FIG. 3, step 310. Such mapping and binding is typically done by the compiler and/or interpreter.

Concerning step 315 in FIG. 3, though polymorphism, it is not necessary to map what extension goes to which necessary function call in the system management tool; rather, this is done by the interpreter and/or compiler working in conjunction with the computer operating system, as a feature of polymorphism. Thus when the users of the present invention execute a system management command (or if it is executed automatically during remote or automatic installation of a program), the mechanism of the present invention will intelligently route the request of the command to the proper extension implementation in the network, as shown in step 315 of FIG. 3. This intelligent routing can happen either within a node (computer) in the network, or, outside the boundaries of a particular node (computer) in the network, and can map and route components of software that may reside on other nodes (computers) in the network.

Finally, assuming no exceptions that can be handled in the normal course of the program, the program ends normally as per step 320.

Although the present invention has been described in terms of the preferred embodiments above, numerous modifications and/or additions to the above-described preferred embodiments would be readily apparent to one skilled in the art. For example, while in the preferred embodiment the software of the present invention is directed to system management software, other types of software can also be accommodated by the present invention without departing from the teachings of the present invention. For instance, any piece of software can be made to fit inside a wrapper that can be deemed a system management tool, to both aid in the installation of the software and/or to adapt the software to change its interface and behavior based on installed features and products that reside on a network into which the software is being introduced.

It is intended that the scope of the present invention extends to all such modifications and/or additions and that the scope of the present invention is limited solely by the claims set forth below.

We claim:

1. A method of implementing, in a computer having memory, a system management application tool, said method comprising:

defining a common interface for an application framework;
implementing a plurality of system management commands;
encapsulating each of said plurality of system management commands with said common interface, said system management commands cooperating with said interface;
implementing a conditional extension command corresponding to a system management command of said plurality of system management commands, wherein said conditional extension command comprises a command to control a first software application in a network comprising said computer, and said first software application is conditionally activated by said conditional extension command in response to a determination that a second software application is present within said network;

receiving a request to execute at least one of said plurality of system management commands, wherein said receiving a request to execute at least one of said plurality of system management commands comprises receiving a request to execute said system management command corresponding to said conditional extension command;

networking a plurality of computers in a distributed system together, said plurality of computers comprising at least one client and a server, wherein each of said computers is associated with said common interface, said at least one of said plurality of system management commands having a client-portion residing on said client and a server-portion residing on said server;

invoking said at least one of said plurality of system management commands through said common interface of said application framework system of said management application tool in response to a receipt of said request, wherein said invoking comprises, generating said client-portion dynamically, and communicating with said client-portion at run-time utilizing said framework; and routing said request to execute said system management command corresponding to said conditional extension command across said network to an implementation of said conditional extension command.

2. The method as set forth in claim 1, further comprising:

providing a detailed description of said conditional extension command, said detailed description comprising help files programmably associated with said conditional extension command.

3. The method as set forth in claim 2, further comprising:

providing said help files with national language supported help, in the form of translatable help messages.

4. The method as set forth in claim 1, further comprising:

constructing a system management command object to associate with said system management command;

binding said system management command object to computer memory dynamically, at run-time.

5. The method as set forth in claim 4, further comprising:

constructing said application framework in the Java language.

6. The method as set forth in claim 4, further comprising:

implementing a user-defined command extension to said system management command comprising a command defined by a user to an existing set of system management commands;

wherein said user-defined command extension and said system management command are in a program neutral language format comprising XML format.

7. The method as set forth in claim 1:

wherein said conditional extension command and said system management command are in a program neutral language format comprising XML format.

8. A non-transitory computer readable storage medium having software instructions embodied thereon in the form of computer code, which when executed by a processor, causes said processor to perform a method comprising:

defining a common interface for an application framework;

implementing a plurality of system management commands;

encapsulating each of said plurality of system management commands with said common interface, said system management commands cooperating with said interface;

implementing a conditional extension command corresponding to a system management command of said plurality of system management commands, wherein said conditional extension command comprises a command to control a first software application in a network comprising said computer, and said first software application is conditionally activated by said conditional extension command in response to a determination that a second software application is present within said network;

receiving a request to execute at least one of said plurality of system management commands, wherein said receiving a request to execute at least one of said plurality of system management commands comprises receiving a request to execute said system management command corresponding to said conditional extension command;

networking a plurality of computers in a distributed system together, said plurality of computers comprising at least one client and a server, wherein each of said computers is associated with said common interface, said at least one of said plurality of system management commands having a client-portion residing on said client and a server-portion residing on said server;

invoking said at least one of said plurality of system management commands through said common interface of said application framework system of said management tool in response to a receipt of said request, wherein said invoking comprises, generating said client-portion dynamically, and communicating with said client-portion at run-time utilizing said application framework; and routing said request to execute said system management command corresponding to said conditional extension command across said network to an implementation of said conditional extension command.

9. A system for implementing a system management tool in a distributed system, comprising:

a plurality of computers in a distributed system forming a network, wherein the plurality of computers are associated with a common interface, wherein the plurality of computers comprise a client and a server; and a plurality of system management command software modules for implementing system management commands, wherein said plurality of system management command software modules reside in said plurality of computers in said network;

said plurality of system management command software modules implement a conditional extension command corresponding to a system management command having a client-portion residing on said client and a server-portion residing on said server, further wherein said conditional extension command comprises a command to control a first software application in said network, and said first software application is conditionally activated by said conditional extension command in response to a determination that a second software application is present within said network, and said plurality of system management command software modules communicate via the common interface of an application framework and are encapsulated utilizing said common interface of said application framework wherein said plurality of system management command software modules are configured to, receive a request to execute the system management command corresponding to the conditional extension command;

invoke the system management command through the common interface in response to said request, wherein said invoke comprises, generate said client-portion dynamically, and communicate with said client-portion at run-time utilizing said application framework; and route said request to execute said system management command corresponding to said conditional extension command across said network to an implementation of said conditional extension command.

10. The system according to claim 9 wherein:
said network comprises at least one client and a server;
said system management command modules are comprised of system management command objects;
said system management command module has a client-side object residing on at least one client and a server-side object residing on said server;
said objects are constructed to allow dynamic binding of the client object when said client-side object is instantiated at run-time.

11. The system according to claim 10, wherein:
said system management command object is written in an Object Oriented Programming language;
said system management command object has a base class and at least one inherited class derived from the base class.

12. The system according to claim 11 wherein:
said inherited class is a class for said conditional extension.

13. The system according to claim 11 wherein:
said inherited class is a class for a user-defined command extension, said user-defined command extension programmably associated with help files, said help files including national language support.

14. The system according to claim 13 wherein:
said object oriented programming language is Java; and
said system management command object is written in language comprising the XML format.

15. The system according to claim 11 further comprising:
a compiler for said application framework;
said system management command object having a command request message corresponding to a command request query and a command extension corresponding to the command request query;
said compiler routing said command request message to the command extension dynamically.

16. The system according to claim 15 wherein
said at least one inherited class is a class for software to be conditionally activated through said conditional extension command.

17. The system according to claim 15 wherein:
said at least one inherited class is a class for a user-defined command extension, said user-defined command extension programmably associated with help files, said help files including national language support.

18. The system according to claim 15 wherein:
said object oriented programming language is Java;
and said system management command object is written in language comprising the XML format.

* * * * *